United States Patent
Kaneko et al.

(10) Patent No.: US 11,973,411 B2
(45) Date of Patent: Apr. 30, 2024

(54) POWER SUPPLY UNIT WITH CURRENT CONTROL

(71) Applicant: TOYOTA JIDOSHA KABUSHIKI KAISHA, Toyota (JP)

(72) Inventors: Tomohiko Kaneko, Yokohama (JP); Masayuki Ito, Sunto-gun (JP); Takahiro Umehara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 17/573,936

(22) Filed: Jan. 12, 2022

(65) Prior Publication Data

US 2022/0224232 A1 Jul. 14, 2022

(30) Foreign Application Priority Data

Jan. 14, 2021 (JP) .................................. 2021-004221

(51) Int. Cl.
*H02M 3/158* (2006.01)
*H02M 1/00* (2006.01)

(52) U.S. Cl.
CPC ......... *H02M 1/0009* (2021.05); *H02M 3/158* (2013.01); *H02M 3/1584* (2013.01); *H02M 3/1586* (2021.05)

(58) Field of Classification Search
CPC ............. H02M 3/1584; H02M 3/1586; H02M 1/0009; H02M 1/0032
See application file for complete search history.

(56) References Cited

U.S. PATENT DOCUMENTS

| 2010/0091523 | A1 | 4/2010 | Uno et al. | |
|---|---|---|---|---|
| 2012/0078556 | A1* | 3/2012 | Holmberg | H02M 3/156 702/64 |
| 2016/0241133 | A1 | 8/2016 | Yamakawa et al. | |
| 2018/0205099 | A1 | 7/2018 | Tano et al. | |
| 2018/0337597 | A1* | 11/2018 | Pazhayaveetil | H02M 3/156 |
| 2020/0161974 | A1 | 5/2020 | Tano | |
| 2021/0013803 | A1* | 1/2021 | Tanaka | H02M 3/1584 |
| 2022/0060107 | A1* | 2/2022 | Yaginuma | H02M 1/0009 |
| 2022/0158545 | A1* | 5/2022 | Tan | H02M 1/4225 |

FOREIGN PATENT DOCUMENTS

| JP | 2008131760 A | 6/2008 |
|---|---|---|
| JP | 2016149902 A | 8/2016 |
| JP | 2018116864 A | 7/2018 |
| JP | 2020088971 A | 6/2020 |
| WO | 2009004847 A1 | 1/2009 |

* cited by examiner

*Primary Examiner* — Alex Torres-Rivera
(74) *Attorney, Agent, or Firm* — Hunton Andrews Kurth LLP

(57) ABSTRACT

To provide a power supply unit configured to determine the boundary between the operation modes (continuous mode and discontinuous mode) of a converter with high accuracy. The power supply unit is a power supply unit wherein the controller controls a value of output current of the power supply by controlling a duty ratio by switching the second switch; wherein the controller detects the current value of the reactor acquired by the current sensor, at a frequency of at least n (n is an integer of 2 or more) times in a cycle of the switching.

2 Claims, 4 Drawing Sheets

POWER SUPPLY UNIT WITH CURRENT CONTROL

TECHNICAL FIELD

The disclosure relates to a power supply unit.

BACKGROUND

Several research has been conducted on a converter mounted in a system installed and used in vehicles such as a fuel cell electric vehicle.

For example, Patent Literature 1 discloses a technique for suppressing the output of an unexpectedly large current from a step-up converter.

Patent Literature 2 discloses a fuel cell system configured to prevent a converter from excessively boosting and outputting the actual voltage input from the fuel cell.

Patent Literature 3 discloses a DC-DC converter configured to carry out PWM control or switching frequency control in a current discontinuity mode and make it possible to prevent oscillation in output voltage. Also, Patent Literature 3 discloses a method for controlling the converter.

Patent Literature 1: Japanese Patent Application Laid-Open (JP-A) No. 2020-088971
Patent Literature 2: JP-A No. 2018-116864
Patent Literature 3: JP-A No. 2008-131760

A converter has two operation modes: a discontinuous mode (the sensitivity of the current value to the duty ratio is low) and a continuous mode (the sensitivity of the current value to the duty ratio is high).

In the continuous mode of the converter, generally, the amount of change in the output current of the converter relative to the amount of increase in the duty ratio, is larger than the case of the discontinuous mode. In the continuous mode, accordingly, there is the following possibility, for example: in the case where a slight gap in the calculation result of the duty ratio is produced, an unexpectedly large current which is much larger than a necessary current, is output from the converter.

In Patent Literature 1, it is judged whether the current operation mode is a continuous mode or a discontinuous mode, by a feedforward item for discontinuous mode and a feedforward item for continuous mode, whichever is smaller. The feedforward item for discontinuous mode is calculated based on reactor inductance, carrier frequency, converter inlet voltage and converter outlet voltage. The feedforward item for continuous mode is calculated based on converter inlet voltage and converter outlet voltage. However, in the case where the reactor inductance disagrees with the target value due to variation in products, etc., and in the case where the measured sensor values of the converter inlet and outlet voltages vary, there is a possibility that the control device cannot correctly recognize the boundary between the continuous mode and the discontinuous mode. For example, there is the following possibility: even though the current operation mode is the continuous mode, the controller incorrectly recognizes it as the discontinuous mode, and the controller sets the limit value of the ascent rate of the duty ratio higher, thereby causing current hunting. Also, there is a possibility such that even though the current operation mode is the discontinuous mode, the controller incorrectly recognizes it as the continuous mode, and the controller sets the limit value of the ascent rate of the duty ratio lower, thereby reducing the responsivity to current change.

SUMMARY

The disclosed embodiments were achieved in light of the above circumstances. An object of the disclosed embodiments is to provide a power supply unit configured to determine the boundary between the operation modes (continuous mode and discontinuous mode) of a converter with high accuracy.

In a first embodiment, there is provided a power supply unit comprising a power supply and a converter configured to execute at least one of step-up and step-down of an output voltage of the power supply,
wherein the converter comprises a reactor, a first switch, a second switch, a current sensor and a controller;
wherein the reactor is connected to an anode side of the power supply;
wherein the first switch is connected between the reactor and an output node;
wherein the second switch connects a region between the reactor and the first switch to a cathode side of the power supply;
wherein the current sensor acquires a value of current passing through the reactor;
wherein the controller controls a value of output current of the power supply by controlling a duty ratio by switching the second switch;
wherein the controller detects the current value of the reactor acquired by the current sensor, at a frequency of at least n (n is an integer of 2 or more) times in a cycle of the switching; and
wherein, in a case where there is no current value point that the current value of the reactor is equal to or less than a threshold among n current value points measured in the cycle of the switching, the controller makes a duty ratio change rate small compared to a case where there is a current value point that the current value of the reactor is equal to or less than the threshold among the n current value points measured in the cycle of the switching.

In a case where there is one or more and less than m (m is an integer of 2 or more) current value points that the current value of the reactor is equal to or less than the threshold, the controller may make the duty ratio change rate small compared to a case where there are m or more current value points that the current value of the reactor is equal to or less than the threshold.

The controller may detect the current value of the reactor acquired by the current sensor, at a frequency of at least x (x is an integer of 3 or more) times in the cycle of the switching, and a cycle in which the controller detects the current value of the reactor at a timing just before the second switch is switched from OFF to ON in the cycle of the switching, may be shorter than the cycle in which the controller detects the current value of the reactor at a timing other than the timing just before the second switch is switched from OFF to ON in the cycle of the switching.

By the power supply unit of the disclosed embodiments, the boundary between the operation modes (continuous mode and discontinuous mode) of a converter can be determined with high accuracy.

BRIEF DESCRIPTION OF THE DRAWINGS

In the accompanying drawings.

DETAILED DESCRIPTION

The power supply unit of the disclosed embodiments is a power supply unit comprising a power supply and a converter configured to execute at least one of step-up and step-down of an output voltage of the power supply, wherein the converter comprises a reactor, a first switch, a second switch, a current sensor and a controller;

wherein the reactor is connected to an anode side of the power supply;

wherein the first switch is connected between the reactor and an output node;

wherein the second switch connects a region between the reactor and the first switch to a cathode side of the power supply;

wherein the current sensor acquires a value of current passing through the reactor;

wherein the controller controls a value of output current of the power supply by controlling a duty ratio by switching the second switch;

wherein the controller detects the current value of the reactor acquired by the current sensor, at a frequency of at least n (n is an integer of 2 or more) times in a cycle of the switching; and wherein, in a case where there is no current value point that the current value of the reactor is equal to or less than a threshold among n current value points measured in the cycle of the switching, the controller makes a duty ratio change rate small compared to a case where there is a current value point that the current value of the reactor is equal to or less than the threshold among the n current value points measured in the cycle of the switching.

Figure 1:
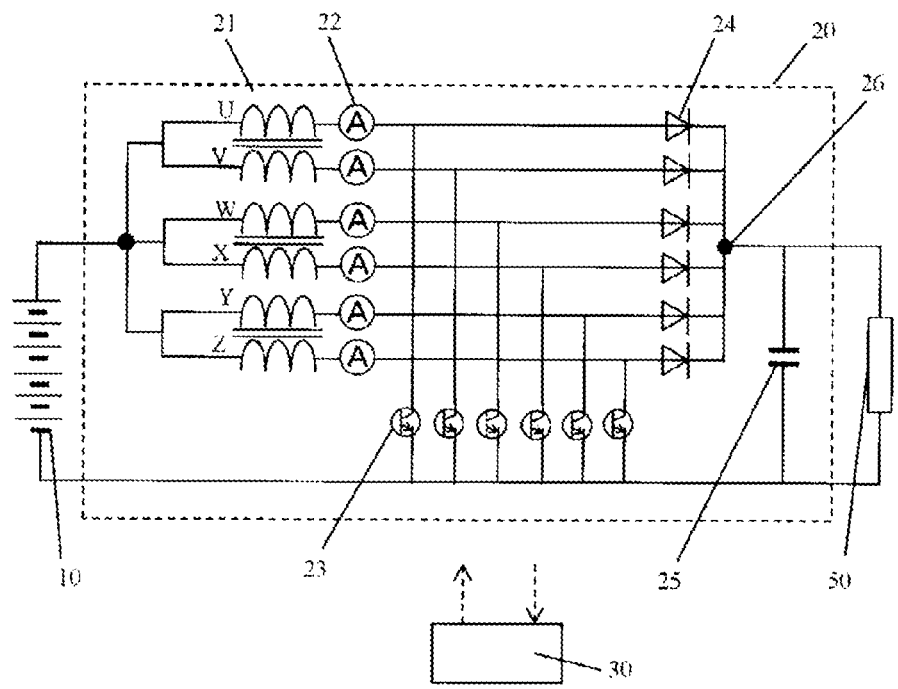
FIG. 1 is a view showing an example of the circuit configuration of a system including the power supply unit.

FIG. 1 is a view showing an example of the circuit configuration of a system including the power supply unit.

For example, the system shown in FIG. 1 is installed in vehicles, and as an external load 50, a vehicle drive motor is connected via an inverter. Also, the system may include a battery (not shown) in parallel with a fuel cell 10 and a step-up converter 20. The battery may be a conventionally-known secondary battery such as a nickel-hydrogen secondary battery and a lithium ion secondary batter. The battery may include a power storage element such as an electric double layer capacitor.

The output power of the fuel cell 10, which is the power supply, is stepped up by the step-up converter 20, converted from direct to alternate by the inverter, and then supplied to the motor.

The step-up converter 20 includes 6 step-up circuits which are connected in parallel with each other. Each two of the six step-up circuits may be magnetically coupled with each other.

Each step-up circuit includes a reactor 21. The reactor 21 is connected to the anode side of the fuel cell 10. A first switch (diode) 24 is connected between the reactor 21 and an output node 26. A second switch (switching element) 23 connects the region between the reactor 21 and the first switch 24 to the cathode side of the fuel cell 10. A current sensor 22 acquires the value of the current passing through the reactor 21.

A controller 30 controls the step-up ratio of the converter 20 and the value of the output current of the fuel cell 10 by controlling the duty ratio by switching the second switch (switching element) 23 to ON/OFF.

The power supply unit includes the power supply and the converter.

The power supply may be a fuel cell. The fuel cell may be a single unit cell, or it may be a fuel cell stack composed of stacked unit cells.

The converter executes at least one of step-up and step-down of the output voltage of the power supply. The converter may be a step-up converter, a step-down converter or a step-up/step-down converter.

The converter includes the reactor, the first switch, the second switch, the current sensor and the controller. As needed, the converter may include a diode, a capacitor and so on.

In the circuits of the converter, the reactor is connected to the anode side of the power supply.

The reactor includes a coil and a core.

One or more coils may be wound around the core.

The core and coil of the reactor may be selected from cores and coils used in conventionally-known converters.

In the circuits of the converter, the first switch is connected between the reactor and the output node.

In the circuits of the converter, the second switch connects the region between the reactor and the first switch to the cathode side of the power supply.

Each of the first and second switches may be a switching element. The switching element may be IGBT, MOSFET or the like.

The first switch may be a diode.

The current sensor is not particularly limited, as long as it can acquire the value of the current passing through the reactor (reactor current). As the current sensor, for example, a conventionally-known current meter may be used.

The controller may be an electronic control unit (ECU), for example. The ECU includes a central processing unit (CPU), a memory and an input-output buffer.

The controller controls the value of the output current of the power supply by controlling the duty ratio by switching at least the second switch. As needed, the controller may control the duty ratio by switching the first switch.

First Embodiment

The controller detects the current value of the reactor acquired by the current sensor, at a frequency of at least n (n is an integer of 2 or more) times in the cycle of the switching.

In the disclosed embodiments, the cycle of the switching (switching cycle) means a period starting from the time when the switch is switched from OFF to ON until the time when the switch is again switched from OFF to ON.

In the case where there is no current value point that the current value of the reactor is equal to or less than the threshold among the n current value points measured in the cycle of the switching, the controller makes the duty ratio change rate small compared to the case where there is a current value point that the current value of the reactor is equal to or less than the threshold among the n current value points measured in the cycle of the switching.

In the case where there is one or more current value points that the current value of the reactor is equal to or less than the threshold, the operation mode of the converter is judged as the discontinuous mode, and the duty ratio change rate is set to a large value compared to the continuous mode. On the other hand, in the case where there is no current value point that the current value of the reactor is equal to or less than the threshold, the operation mode is judged as the continuous mode, and the duty ratio change rate is set to a small value compared to the discontinuous mode.

In the disclosed embodiments, the operation mode of the converter is judged as the continuous or discontinuous mode by monitoring the actually measured current value and its threshold, and it is not judged by the properties the components have. As needed, the frequency of the monitoring is changed by the timing of current measurement.

The current value of the reactor is detected at a frequency of at least n (n is an integer of 2 or more) times in the cycle of the switching (multi-point sampling). Accordingly, the operation mode of the converter is directly judged as the continuous or discontinuous mode by the value of the actually flowing current. Accordingly, the boundary between the continuous mode and the discontinuous mode can be determined with high accuracy. Accordingly, the duty ratio change rate can be appropriately set; the occurrence of current hunting can be suppressed; and a reduction in responsivity can be suppressed. Also, the operation mode of the converter can be judged as the continuous or discontinuous mode every time the switching cycle is switched, and depending on the result of the judgement, the duty ratio change rate can be controlled.

Figure 2:
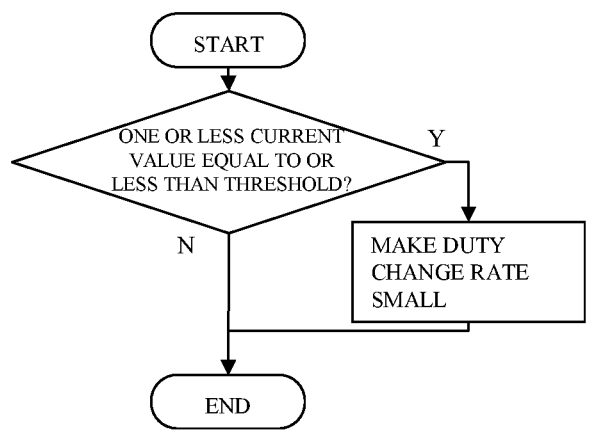
FIG. 2 is a flowchart of an example of the control for determining the duty ratio change rate.

FIG. 2 is a flowchart of an example of the control for determining the duty ratio change rate.

In the first embodiment, the reactor current value is acquired at n (n is an integer of 2 or more) or more points in the switching cycle. Depending on the presence or absence of the current value point that the current value is equal to or less than the threshold, the duty ratio change rate is decided.

In the case where there is less than one current value point that the current value is equal to or less than the threshold, the controller judges the operation mode as the continuous mode and makes the duty ratio change rate small. On the other hand, in the case where there is one or more current value points that the current value is equal to or less than the threshold, the controller judges the operation mode as the discontinuous mode and leaves the duty ratio change rate as it is, or the controller may make the duty ratio change rate large compared to the case of the continuous mode.

Second Embodiment

In the case where there is one or more and less than m (m is an integer of 2 or more) current value points that the current value of the reactor is equal to or less than the threshold, the controller may make the duty ratio change rate small compared to the case where there are m or more current value points that the current value of the reactor is equal to or less than the threshold.

When there is one or more and less than m (m is an integer of 2 or more) current value points that the current value of the reactor is equal to or less than the threshold, the operation mode is judged as the discontinuous mode and as coming close to the continuous mode, and the duty ratio change rate can be set to a smaller value than the case of the discontinuous mode.

Even in the case where the cycle of the current sampling is not sufficiently short relative to the cycle of the switching, the boundary between the continuous mode and the discontinuous mode can be determined with high accuracy, without excessively shortening the cycle of the current sampling and without excessively increasing the calculation time. Accordingly, the occurrence of current hunting at the timing of switching the continuous mode and the discontinuous mode, can be more suppressed.

The threshold may be substantially 0, or it may be determined by counting the number of current value points that the current value is 0. In the case where the threshold is far from 0 and there is a current value point that the current value of the reactor is equal to or less than the threshold, the operation mode may be judged as the discontinuous mode, or it may be judged as the discontinuous mode and as coming close to the continuous mode.

The threshold may be 1 A, for example. By setting the threshold to a value close to 0, the operation mode can be appropriately judged as the continuous or discontinuous mode. Actually, even in the case where no current passes, a slight current value may be detected due to measurement errors or the like made by the sensor. The threshold may be set by considering such detection errors made by the current sensor. Accordingly, the misrecognition of the mode due to detection errors made by the current sensor, can be suppressed. For example, the threshold may be set to approximately 1% to 3% of the rated current.

The continuous mode and the discontinuous mode may be judged by the following (A) to (C), for example.

(A) In the case where the operation mode is the continuous mode, there is no current value point that the current value is approximately equal to 0 (current value≅0) in the switching cycle.

(B) In the case where the operation mode is the discontinuous mode, there are 2 or more current value points that the current value is approximately equal to 0 (current value≅0) in the switching cycle.

(C) In the case where the operation mode is the boundary between the continuous mode and the discontinuous mode, there is only one current value point that the current value is approximately equal to 0 (current value≅0) in the switching cycle.

For example, in the case where there is one to three current value points that the current value is 0 in the switching cycle, the operation mode may be judged as the boundary between the continuous mode and the discontinuous mode. At this time, the operation mode is judged as the discontinuous mode in the case where there are 4 or more current value points that the current value is 0.

No particular limitation is imposed on the number of current value points that the current value is approximately equal to 0 (current value≅0) in the switching cycle for judgment of the boundary between the continuous mode and the discontinuous mode. The number is not limited to one, or it is not limited to one to three. The number may be one or two, or it may be one to five. The number may be approximately determined depending on the number of current value points sampled in the switching cycle, the current sampling cycle, and the intended application of the power supply unit, for example.

For example, in the case where the current sampling cycle is short and the number of current number points sampled in the switching cycle is approximately 100, the operation mode may be judged as the discontinuous mode and as coming close to the continuous mode, even if the number of current value points that the current value is equal to or less than the threshold, is 2 to 5, for example.

In the case of the power supply unit in which a change in required load is large, even if the number of current value points that the current value is equal to or less than the threshold at the time of current measurement, is 2 to 5, there is a possibility that the operation mode shifts into the continuous mode just after that. Accordingly, the operation mode may be judged as the discontinuous mode and as coming close to the continuous mode.

In the actual control, there may be a certain time lag after the operation mode of the converter is judged and before the device is operated. As described above, by judging the boundary part in advance, the occurrence of current hunting can be suppressed even if there is a time lag.

Even if there is a timing at which the current is 0 (current=0), there is a possibility that no current can be detected at the time when the current is 0 (current=0), such as the case where the current sampling cycle is not sufficiently short at that timing. Accordingly, the judgment may be carried out with sufficiently small current values each of which is not 0, for example. For example, the number of measured current value points that the current value is 5 A or less, may be counted. Depending on the number of current value points that the current value is equal to or less than 5 A (current value≤5 A), the operation mode can be judged as the discontinuous mode, or it can be judged as the continuous mode and as coming close to the discontinuous mode.

In the above-described embodiments, the condition of judging the operation mode as the boundary between the continuous mode and the discontinuous mode, is always fixed. However, it may be changed depending on the operation condition, for example.

For example, in the case where the duty ratio change rate is large, the continuous mode and discontinuous mode of the reactor current are switched at a fast rate.

Accordingly, in the case where the duty ratio change rate is large, the number of measured current value points that the current value is approximately equal to 0 (current value≈0) for judging the operation mode as the boundary between the continuous mode and the discontinuous mode, may be increased compared to the case where the change rate is small. Accordingly, the occurrence of current hunting can be suppressed even in the case where there is a certain time lag after the operation mode of the converter is judged and before the device is operated.

Figure 3:
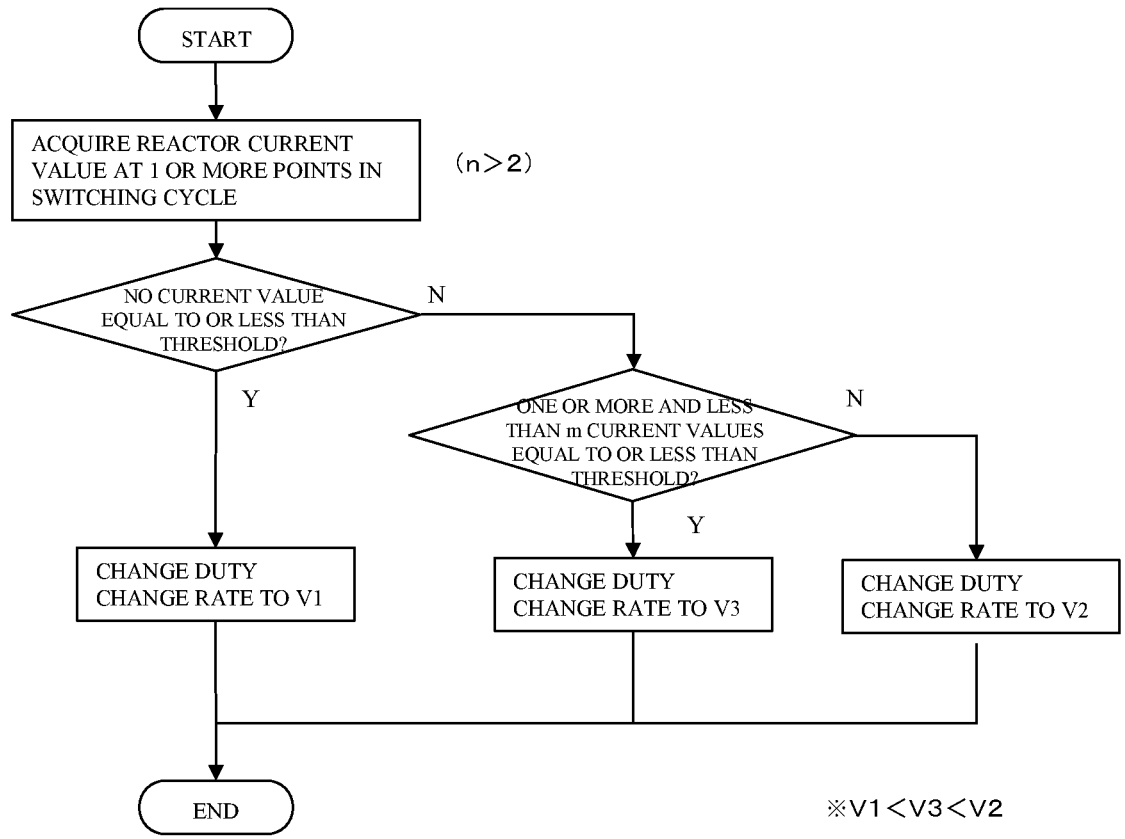
FIG. 3 is a flowchart of another example of the control for determining the duty ratio change rate.

FIG. 3 is a flowchart of another example of the control for determining the duty ratio change rate.

The reactor current value is acquired at n (n is an integer of 2 or more) or more points in the switching cycle. Depending on the number of the current value points that the current value is equal to or less than the threshold, the duty ratio change rate is determined.

In the case where there is no current value point that the current value is equal to or less than the threshold, the controller judges the operation mode as the continuous mode and sets the duty ratio change rate to V1.

In the case where there are m or more current value points that the current value is equal to or less than the threshold, the controller judges the operation mode as the discontinuous mode and sets the duty ratio change rate to V2.

In the case where there is one or more and less than m current value points that the current value is equal to or less than the threshold, the controller judges the operation mode as the discontinuous mode and as coming close to the continuous mode and sets the duty ratio change rate to V3. The relationship between V1, V2 and V3 is V1<V3<V2.

Figure 4:
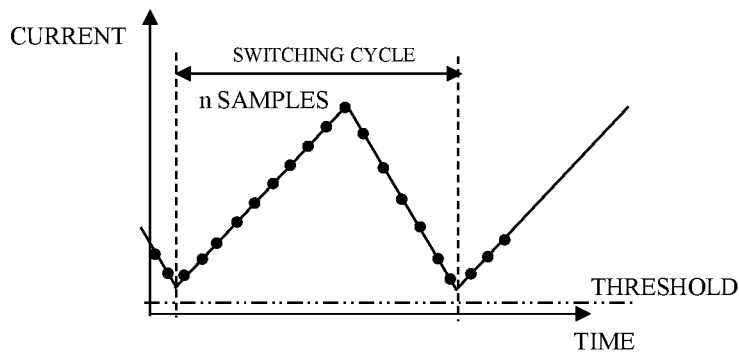
FIG. 4 is a view showing a change in the value of the current passing through the reactor in the switching cycle in the continuous mode.

FIG. 4 is a view showing a change in the value of the current passing through the reactor in the switching cycle in the continuous mode.

Figure 5:
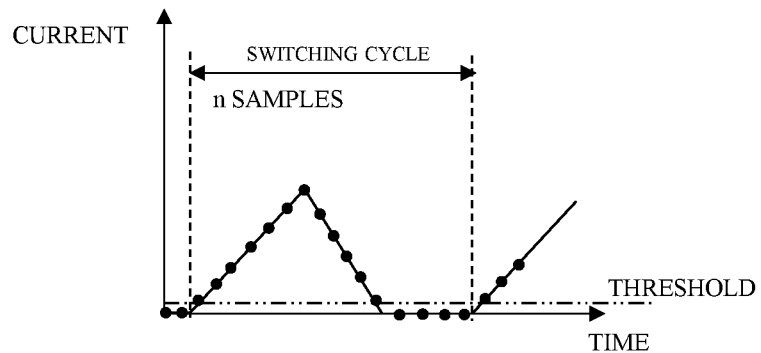
FIG. 5 is a view showing a change in the value of the current passing through the reactor in the switching cycle in the discontinuous mode (1)

FIG. 5 is a view showing a change in the value of the current passing through the reactor in the switching cycle in the discontinuous mode (1).

Figure 6:
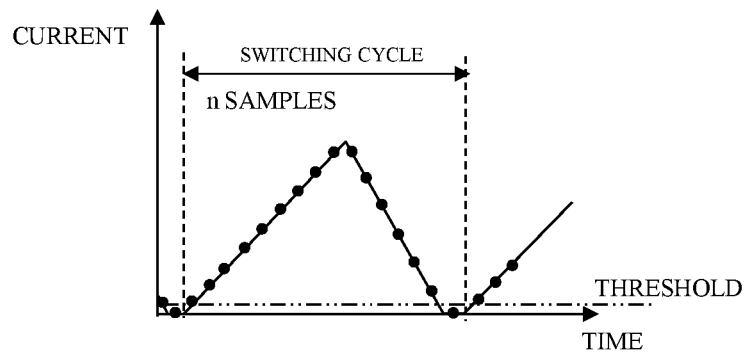
FIG. 6 is a view showing a change in the value of the current passing through the reactor in the switching cycle in the discontinuous mode (2)

FIG. 6 is a view showing a change in the value of the current passing through the reactor in the switching cycle in the discontinuous mode (2).

In the continuous mode shown in FIG. 4, during the switching cycle, current always passes through the reactor. In the discontinuous modes shown in FIGS. 5 and 6, the switching cycle includes a period in which no current passes through the reactor.

Each of black circles shown in FIGS. 4 to 6 indicates a current value point measured in multi-point sampling, and there are 16 measured current value points in the switching cycle. The intervals of time between the measured current value points are regular, and the average of the current values is calculated as the average current value of the reactor.

In the continuous mode shown in FIG. 4, all of the current values of the measured current value points are more than the threshold, and there is no current value point that the current value is equal to or less than the threshold. Since there is no current value point that the current value is equal to or less than the threshold, the controller judges the operation mode as the continuous mode, and the controller sets the duty ratio change rate to a relatively low value: V1.

In the discontinuous mode (1) shown in FIG. 5, there are 4 measured current value points that the current value is equal to or less than the threshold in the switching cycle. Since the number of current value points that the current value is equal to or less than the threshold is two, the controller judges the operation mode as the discontinuous mode, and the controller sets the duty ratio change rate to a value higher than the case of the continuous mode: V2.

In the discontinuous mode (2) shown in FIG. 6, there is one measured current value point that the current value is equal to or less than the threshold. Since the number of current value points that the current value is equal to or less than the threshold is one or more and less than 2, the controller judges the operation mode as the discontinuous mode and as coming close to the continuous mode, and the controller sets the duty ratio change rate to a value between V1 and V2:V3.

Figure 7:
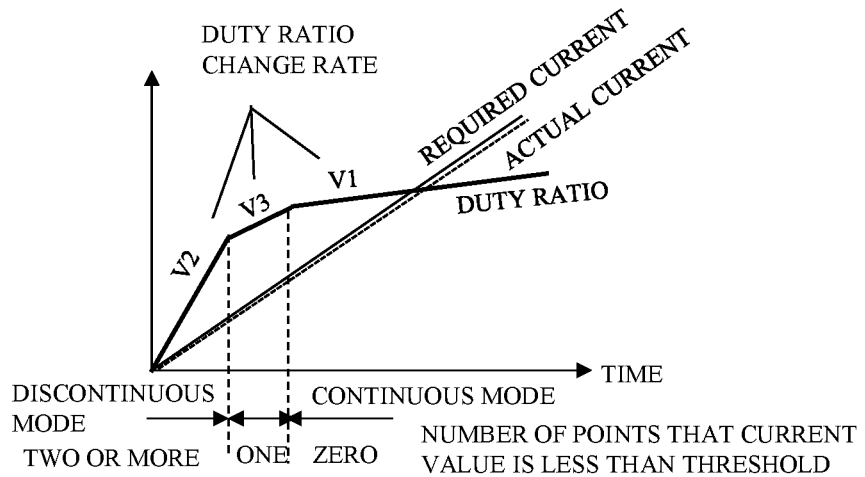
FIG. 7 is a view showing a relationship between time and duty ratio change rate in the case where the gradient of required current is large.

FIG. 7 is a view showing a relationship between time and duty ratio change rate in the case where the gradient of required current is large.

Figure 8:
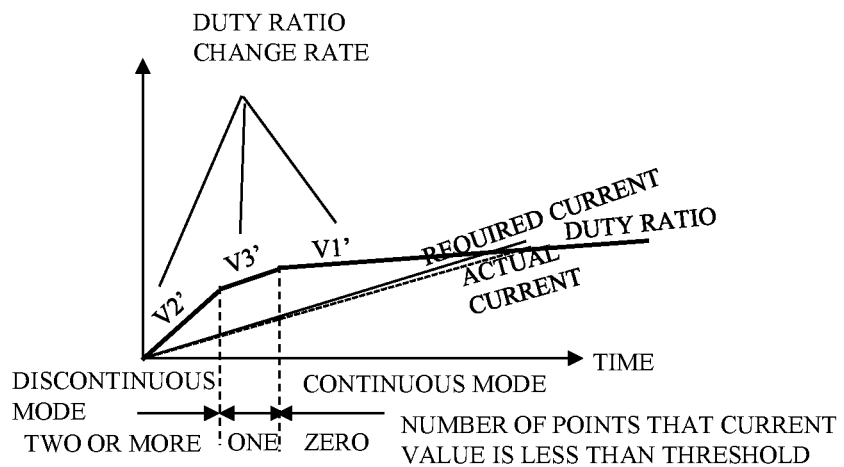
FIG. 8 is a view showing a relationship between time and duty ratio change rate in the case where the gradient of required current is small.

FIG. 8 is a view showing a relationship between time and duty ratio change rate in the case where the gradient of required current is small.

In general, the rate of changing the duty ratio of the converter by the controller, varies depending on a request from the system such as a vehicle. FIGS. 7 and 8 show state that the output current of the fuel cell increases as time advances. The increase rate of the output current of the fuel cell is larger in FIG. 7 than in FIG. 8. At this time, the rate of increasing the duty ratio of the converter (i.e., the gradient of the graph) is larger in FIG. 7 than in FIG. 8.

In FIGS. 7 and 8, in the case where, like FIG. 4, the number of current value points that the current value is equal to or less than the threshold, is 0, V1 (or V1') is set as the duty ratio change rate; in the case where, like FIG. 5, the number of current value points that the current value is equal to or less than the threshold, is 2 or more, V2 (or V2') is set as the duty ratio change rate; and in the case where, like FIG. 6, the number of current value points that the current value is equal to or less than the threshold, is one or more and less than 2, V3 (or V3') is set as the duty ratio change rate.

For the duty ratio change rate, the relationship between V1, V2 and V3 is V1<V3<V2, and the relationship between V1', V2' and V3' is V1'<V3'<V2'.

The above-described embodiment, the relationship is V1<V3<V2. In another embodiment, the value of V3 may be the same as that of V2, or the value of V3 may be the same as that of V1.

Third Embodiment

The controller may detect the current value of the reactor acquired by the current sensor, at a frequency of at least x (x is an integer of 3 or more) times in the cycle of the switching.

The cycle in which the controller detects the current value of the reactor at a timing just before the second switch is switched from OFF to ON in the cycle of the switching, may be shorter than the cycle in which the controller detects the current value of the reactor at a timing other than the timing just before the second switch is switched from OFF to ON in the cycle of the switching.

Figure 9:
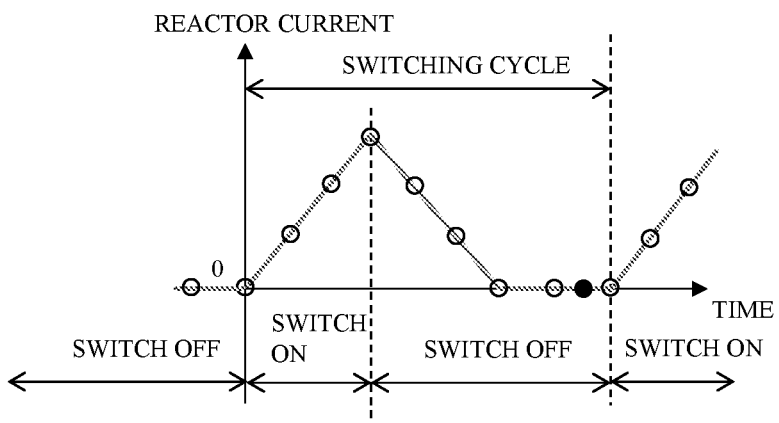
FIG. 9 is a view showing a change in the value of the current passing through the reactor in the switching cycle in the discontinuous mode (3).

FIG. 9 is a view showing a change in the value of the current passing through the reactor in the switching cycle in the discontinuous mode (3).

Each of the white circles and black circle shown in FIG. 9 indicates the timing of current sampling.

The white circles are arranged at regular intervals. Meanwhile, just before "Switch ON", current sampling is also carried out at the black circle. Accordingly, just before "Switch ON", the cycle of the sampling is shorter than others.

Accordingly, the boundary between the continuous mode and the discontinuous mode can be sensed with higher accuracy, without excessively increasing the calculation time. Accordingly, the occurrence of current hunting at the timing of switching the continuous mode and the discontinuous mode, can be more suppressed.

In the case where the cycle of the current sampling is not sufficiently short relative to the cycle of the switching, there is a possibility that the boundary between the continuous mode and the discontinuous mode cannot be correctly determined. On the other hand, in the case where the cycle of the current sampling is excessively shortened, the calculation time increases. Accordingly, there is a possibility of delay in feedback and difficulty in completing the control.

Accordingly, the cycle of the current sampling just before the second switch of the circuits is switched from OFF to ON, may be shorter than the cycle at other timings in the cycle of the switching.

In the case of multi-point sampling of current, generally, current sampling is carried out at regular intervals in the cycle of the switching, and the average is calculated, thereby obtaining the average current value. The same applies to the first and second embodiments.

For example, while the frequency of switching is 10 kHz, the frequency of current sampling is set to 100 kHz.

However, in some cases, a frequency of 100 kHz is not enough to more correctly sense the timing at which the current passing through the reactor (reactor current) is switched between the continuous mode and the discontinuous mode. That is, to more correctly sense the timing, the frequency may be 200 kHz.

However, if the frequency of current sampling is set to 200 kHz throughout the current sampling, the calculation time increases. Accordingly, there is a possibility of delay in feedback and difficulty in completing the control.

In the continuous mode, the value of passing current is always larger than 0. In the discontinuous mode, at least just before the second switch of the circuits is switched from OFF to ON, the current value is 0. Accordingly, to judge whether the operation mode is the continuous mode or the discontinuous mode, the cycle of the current sampling may be shortened (the frequency may be increased) only just before the second switch of the circuits is switched from OFF to ON.

In the third embodiment, while the cycle of the switching is 1/10,000 seconds, only in the period of 1/100,000 seconds just before the second switch is switched from OFF to ON, the frequency may be set to 200 kHz, and the frequency may be set to 100 kHz in other periods.

As a result, the number of the measured current value points can be increased, and the timing at which the reactor current is switched between the continuous mode and the discontinuous mode, can be more correctly sensed without increasing the calculation time more than necessary.

To calculate the average current value, current values that are sampled just before the switch is switched from OFF to ON, may be excluded. Accordingly, a slight gap in the average current value, which is due to that the cycle of current sampling is uneven, can be suppressed.

REFERENCE SIGNS LIST

10: Fuel cell
20: Step-up converter
21: Reactor
22: Current sensor
23: Second switch (Switching element)
24: First switch (Diode)
25: Capacitor
26: Output node
30: Controller
50: External load

The invention claimed is:

1. A power supply unit comprising a power supply and a converter configured to execute at least one of step-up and step-down of an output voltage of the power supply,
   wherein the converter comprises a reactor, a first switch, a second switch, a current sensor and a controller;
   wherein the reactor is connected to an anode side of the power supply;
   wherein the first switch is connected between the reactor and an output node;
   wherein the second switch connects a region between the reactor and the first switch to a cathode side of the power supply;
   wherein the current sensor acquires a value of current passing through the reactor;
   wherein the controller is configured to controls a value of output current of the power supply by controlling a duty ratio by switching the second switch;
   wherein the controller is configured to detects the current value of the reactor acquired by the current sensor, at a frequency of at least n (n is an integer of 2 or more) times in a cycle of the switching;
wherein, in a case where there is no current value point that the current value of the reactor is equal to or less than a threshold among n current value points measured in the cycle of the switching, the controller is configured to makes a duty ratio change rate small compared to a case where there is a current value point that the current value of the reactor is equal to or less than the threshold among the n current value points measured in the cycle of the switching;
wherein, in a case where there is one or more and less than m (m is an integer of 2 or more) current value points that the current value of the reactor is equal to or less than the threshold, the controller is configured to make the duty ratio change rate small compared to a case where there are m or more current value points that the current value of the reactor is equal to or less than the threshold;
wherein the controller is configured to detect the current value of the reactor acquired by the current sensor, at a frequency of at least x (x is an integer of 3 or more) times in the cycle of the switching;
wherein a cycle in which the controller detects the current value of the reactor at a timing just before the second switch is switched from OFF to ON in the cycle of the switching, is shorter than the cycle in which the controller detects the current value of the reactor at a timing other than the timing just before the second switch is switched from OFF to ON in the cycle of the switching; and
wherein while the cycle of the switching is 1/10,000 seconds, only in the period of 1/100,000 seconds just before the second switch is switched from OFF to ON, the frequency is set to 200 kHz, and the frequency is set to 100 kHz in other periods.

2. The power supply unit according to claim 1,
wherein the controller is configured to detect the current value of the reactor acquired by the current sensor, at a frequency of at least x (x is an integer of 10 or more) times in the cycle of the switching.

\* \* \* \* \*